United States Patent
Nakshatrala et al.

(10) Patent No.: US 11,237,283 B2
(45) Date of Patent: Feb. 1, 2022

(54) VISCO-PSEUDO-ELASTIC TTI FWI/RTM FORMULATION AND IMPLEMENTATION

(71) Applicants: Praveen Nakshatrala, Spring, TX (US); Anoop A. Mullur, Clinton, NJ (US); Hong Zhao, Houston, TX (US); Valeriy V. Brytik, Houston, TX (US)

(72) Inventors: Praveen Nakshatrala, Spring, TX (US); Anoop A. Mullur, Clinton, NJ (US); Hong Zhao, Houston, TX (US); Valeriy V. Brytik, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 467 days.

(21) Appl. No.: 16/000,960

(22) Filed: Jun. 6, 2018

(65) Prior Publication Data

US 2019/0018155 A1    Jan. 17, 2019

Related U.S. Application Data

(60) Provisional application No. 62/532,070, filed on Jul. 13, 2017.

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01); *G01V 1/306* (2013.01);
(Continued)

(58) Field of Classification Search
CPC .............................. G01V 1/282; G01V 1/303
See application file for complete search history.

(56) References Cited

U.S. PATENT DOCUMENTS 8,194,498 B2    6/2012  Du et al.
2009/0213693 A1*  8/2009  Du .................... G01V 1/282
                                                    367/73
(Continued)

FOREIGN PATENT DOCUMENTS

EP            3076205 A1    10/2016

OTHER PUBLICATIONS

Thomas L. Szabo, and Junru Wu, A model for longitudinal and shear wave propagation in viscoelastic media, Feb. 16, 2000, Acoustical Society of America, 107, 2437 (2000); doi: 10.1121/1.428630, pp. 2437-2446.*

(Continued)

*Primary Examiner* — Eman A Alkafawi
(74) *Attorney, Agent, or Firm* — ExxonMobil Upstream Research Company—Law Department (57) ABSTRACT

A method, including: obtaining, with a computer, an initial geophysical model; modeling, with a computer, a forward wavefield based on the initial geophysical model with wave equations including a second order z-derivative in a rotated coordinate system that accounts for a tilted transverse isotropic (TTI) medium; modeling, with a computer, an adjoint wavefield with adjoint wave equations including a second order z-derivative in a rotated coordinate system that accounts for a tilted transverse isotropic (TTI) medium, wherein the wave equations and the adjoint wave equations include relaxation terms accounting for anelasticity of earth in an update of a primary variable and an evolution relationship for the relaxation terms; and obtaining, with a computer, a gradient of a cost function based on a combination of a model of the forward wavefield and a model of the adjoint wavefield.

11 Claims, 3 Drawing Sheets

(52) U.S. Cl.
CPC .. *G01V 2210/614* (2013.01); *G01V 2210/622* (2013.01); *G01V 2210/675* (2013.01); *G01V 2210/679* (2013.01)

(56) References Cited

U.S. PATENT DOCUMENTS

| | | | |
|---|---|---|---|
| 2013/0060544 A1 | 3/2013 | Bakker et al. | 703/2 |
| 2013/0238246 A1 | 9/2013 | Krebs et al. | |
| 2015/0362622 A1* | 12/2015 | Denli | G01V 99/005 703/2 |
| 2016/0091622 A1* | 3/2016 | Pei | G01V 1/306 702/11 |
| 2016/0291178 A1* | 10/2016 | Xie | G01V 1/362 |
| 2016/0291180 A1 | 10/2016 | Washbourne et al. | G01V 1/306 |

OTHER PUBLICATIONS

Delaney, S. et al. (2016) "Tilted Transverse Isotropic Reverse Time Migration with Angle Gathers: Implementation and Efficiency," *Geophysics*, vol. 81, No. 6, pp. S419-S432.

Operto, S. et al. (2009) "Finite-Difference Frequency-Domain Modeling of Viscoacoustic Wave Propagation in 2D Tilted Transversely Isotropic (TTI) Media," *Geophysics*, vol. 74, No. 5, pp. T75-T95.

Zhang, Y. et al. (2011) "A Stable TTI Reverse Time Migration and its Implementation," *Geophysics*, v. 76, No. 3, pp. WA3-WA11.

Robertsson et al. (1994) "Viscoelastic finite-difference modeling," *Geophysics*, v. 59, No. 9, pp. 1444-1456.

Royle, G. T. (2011) "Viscoelastic Orthorhombic Full Wavefield Inversion: Development of Multiparameter Inversion Methods," *Society of Geophysicist Extended Abstract*, pp. 4329-4333.

Sun et al. (2014), "Viscoacoustic modeling and imaging using low-rank approximation," *SEG Technical Program Expanded Abstracts*, v. 80, No. 5, pp. A-103-A108.

Tarantola (1984) "Inversion of seismic reflection data in the acoustic approximation," Geophysics, v. 49, No. 8, pp. 1259-1266.

Thevenin et al. (2008) "Optimization and Computational Fluid Dynamics," Springer-Verlag, Chapter 4: Adjoint Methods for Shape Optimization, pp. 79-108.

Ursin et al. (2002) "Comparison of seismic dispersion and attenuation models," *Studia Geophysica et Geodaetica*, v. 46, No. 2, pp. 293-320.

Valenciano et al. (2011) "Wave equation migration with attenuation and anisotropic compensation," *81st Annual International Meeting, SEG, Expanded Abstracts*, pp. 232-236.

Yi Xie et al. (2015) "Compensating for visco-acoustic effects in TTI reverse time migration," 2015 SEG New Orleans Annual Meeting., pp. 3996-3998.

Askan et al. (2007) "Full Waveform Inversion for Seismic Velocity and Anelastic Losses in Heterogeneous Structures," *Bulletin of the Seismological Society of America*, v. 97, No. 6, pp. 1990-2008, Dec. 2007, doi: 10.1785/0120070079.

Bai et al. (2012) "Waveform inversion with attenuation," *Society of Exploration Geophysicists Extended Technical Abstract*, 1-5 pgs.

Betts et al. (2005) "Discretize then optimize," *Mathematics in Industry: Challenges and Frontiers A Process View: Practice and Theory*, Ferguson, D.R. and Peters, T.J., eds., SIAM Publications.

Carcione et al. (1988) "Viscoacoustic wave propagation simulation in the Earth," *Geophysics*, vol. 53, issue 6, pp. 769-777.

Carcione J. M. (2015) "Wave Fields in Real Media: Wave Propagation in Anisotropic Anelastic, Porous and Electromagnetic Media", Chapter 2: Viscoelasticity and Wave Propagation, pp. 63-122.

Charara et al. (2000) "Full waveform inversion of seismic data for a viscoelastic medium" *Methods and Applications of Inversion: Lecture Notes in Earth Sciences*, v. 92, pp. 68-81.

Day et al. (1984) "Numerical simulation of attenuated wavefields using a Padé approximant method," Geophysical Journal of International, v. 78, Issue 1, pp. 105-118.

Denli et al., (2013) "Full-Wavefield Inversion for Acoustic Wave Velocity and Attenuation," *SEG Annual Meeting, Society of Exploration Geophysicists*, pp. 980-985.

Emmerich et al. (1987) "Incorporation of attenuation into time-domain computations of seismic wave fields," Geophysics, v. 52, No. 9, pp. 1252-1264.

Hak et al. (2011) "Seismic attenuation imaging with causality," Geophysical Journal International, v. 184, No. 1, pp. 439-451.

Hestholm et al. (2006) "Quick and accurate Q parameterization in viscoelastic wave modeling," *Geophysics*, vol. 71, No. 5, pp. 147-150.

JafarGandomi et al. (2007) "Efficient FDTD algorithm for plane-wave simulation for vertically heterogeneous attenuative media," *Geophysics*, v. 72, No. 4, pp. 43-53.

Käser et al. (2007) "An arbitrary high-order Discontinuous Galerkin method for elastic waves on unstructured meshes—III. Viscoelastic attenuation," *Geophysics Journal International*, v. 168, No. 1, pp. 224-242.

Muller et al. (2010) "Seismic wave attenuation and dispersion resulting from wave-induced flow in porous rocks—A review," *Geophysics*, v. 75, No. 5, pp. 147-164.

Quintal, B., (2012) "Frequency-dependent attenuation as a potential indicator of oil saturation," *Journal of Applied Geophysics*, v. 82, pp. 119-128.

Ramos-Martinez et al. (2015) "Viscoacoustic compensation in RTM using the pseudo-analytical extrapolator," *SEG Technical Program Expanded Abstracts*, pp. 3954-3958.

\* cited by examiner

VISCO-PSEUDO-ELASTIC TTI FWI/RTM FORMULATION AND IMPLEMENTATION

CROSS-REFERENCE TO RELATED APPLICATION

This application claims the benefit of U.S. Provisional Patent Application 62/532,070 filed Jul. 13, 2017 entitled VISCO-PSEUDO-ELASTIC TTI FWI/RTM FORMULATION AND IMPLEMENTATION, the entirety of which is incorporated by reference herein.

TECHNOLOGICAL FIELD

Exemplary embodiments described herein pertain to geophysical prospecting and, more particularly, to seismic data processing using full wavefield inversion or imaging with reverse time migration with models corresponding to a transversely isotropic (TTI) media.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

An important goal of seismic prospecting is to accurately image subsurface structures commonly referred to as reflectors. Seismic prospecting is facilitated by obtaining raw seismic data during performance of a seismic survey. During a seismic survey, seismic energy can be generated at ground or sea level by, for example, a controlled explosion (or other form of source, such as vibrators), and delivered to the earth. Seismic waves are reflected from underground structures and are received by a number of sensors/receivers, such as geophones. The seismic data received by the geophones is processed in an effort to create an accurate mapping of the underground environment. The processed data is then examined with a goal of identifying geological formations that may contain hydrocarbons (e.g., oil and/or natural gas).

High end imaging tools such as Reverse Time Migration (RTM) and Seismic Inversion (Full Wave Inversion (FWI)) have become an important part of the seismic processing, especially in the complex geologic regions. Thus, some regions with highly dipping beds might be best described by Tilted Transverse Isotropic (TTI) models. TTI media have a symmetry axis that is tilted relative to a vertical axis. The regions which host strong absorption effect could be described by introducing quality factor or simply Q (the anelastic attenuation factor). Q is a dimensionless quantity that defines the frequency dependence of the acoustic or elastic moduli. The quality factor itself can be frequency dependent, especially for fluid-bearing rocks such as hydrocarbons, and is typically assumed to be frequency invariant for dry rocks. The situation could become significantly more complicated when different complexities are combined in one place. For example, one could find the situations when the media with highly dipping beds contains gas pockets. For situations like that, the data processor is recommended to use visco-acoustic TTI models. Many solutions for this problem have been suggested in the literature.

Standard Viscoacoustic and Viscoelastic Wavefield Modeling

In the time-domain, intrinsic attenuation (absorption and dispersion) is formulated with convolution operators between strain and relaxation functions. Such convolutions are computationally impractical for large-scale wave propagation simulations using time-marching methods. Incorporation of realistic attenuation into time-domain computations was first achieved using Padé approximants by Day and Minster (Day and Minster, 1984). Later, Padé approximants evolved into sophisticated viscoacoustic and viscoelastic rheological models in rational forms, such as the generalized-Maxwell (GMB) and Standard-Linear-Solid (SLS) models. Attenuation modeling methods in the time domain are based on either the GMB or SLS formulations given by Emmerich and Korn (1987) and Carcione et al. (1988), respectively, and use rheological models based on relaxation mechanisms.

A relaxation mechanism is the unit of the time-domain attenuation model representing viscous effects in a narrow frequency band. Multiple relaxation mechanisms are combined to model attenuation over a desired frequency band, introducing additional state variables and partial differential equations (PDE) to the acoustic and elastic forward wave equations. A considerable amount of computational time and memory are consumed by these additional variables and equations during forward wave simulations and to an even greater degree during adjoint simulations.

Time domain modeling typically can be done using a first order formulation (e.g., stress-velocity). The governing equations for the wave propagation are:

$$\frac{\partial \vec{\sigma}}{\partial t} = C \nabla \vec{v} - \sum_{l=1}^{NMECH} \omega_l \vec{m_l} + \vec{S_\sigma},$$

$$\frac{\partial \vec{v}}{\partial t} = \frac{1}{\rho} div(\vec{\sigma}),$$

$$\frac{\partial \vec{m_l}}{\partial t} = a_l C \nabla \vec{v} - \omega_l \vec{m_l},$$

where $$\vec{\sigma} = \begin{bmatrix} \sigma_{11} \\ \sigma_{22} \\ \sigma_{33} \end{bmatrix}, \vec{v} = \begin{bmatrix} v_1 \\ v_2 \\ v_3 \end{bmatrix}, \vec{m_l} = \begin{bmatrix} m_{l,11} \\ m_{l,22} \\ m_{l,33} \end{bmatrix}, C = \begin{bmatrix} C_{11} & C_{12} & C_{13} \\ C_{21} & C_{22} & C_{23} \\ C_{31} & C_{32} & C_{33} \end{bmatrix},$$

$$\nabla \vec{v} = \begin{bmatrix} \frac{\partial v_1}{\partial x_1} \\ \frac{\partial v_2}{\partial x_2} \\ \frac{\partial v_3}{\partial x_3} \end{bmatrix}, div(\vec{\sigma}) = \begin{bmatrix} \frac{\partial \sigma_{11}}{\partial x_1} \\ \frac{\partial \sigma_{22}}{\partial x_2} \\ \frac{\partial \sigma_{33}}{\partial x_3} \end{bmatrix}.$$

Here $\vec{\sigma}, \vec{v}, \vec{m}$ denote the stress, velocity, memory responses, and $\rho, C$ denote density and material elasticity tensor, respectively. $a_l, \omega_l$ denote stiffness ratio (also called amplification factor) and characteristic relaxation frequency, respectively.

Another alternative formulation can be found in U.S. patent application Ser. No. 14/693,464, the entire content of which is hereby incorporated by reference. This patent application describes a formulation which is obtained from a change of variables $\vec{m_l} = a_l(\vec{\sigma} - \vec{\xi_l})$, which is computationally cheaper. This formulation is summarized as following:

$$\frac{\partial \vec{\sigma}}{\partial t} = C\nabla \vec{v} - \sum_{l=1}^{NMECH} \omega_l a_l (\vec{\sigma} - \vec{\xi_l}) + \vec{S_\sigma},$$

$$\frac{\partial \vec{v}}{\partial t} = \frac{1}{\rho} div(\vec{\sigma}),$$

$$\frac{\partial \vec{\xi_l}}{\partial t} = \omega_l (\vec{\sigma} - \vec{\xi_l}) - \sum_{l=1}^{NMECH} \omega_l a_l (\vec{\sigma} - \vec{\xi_l}) + \vec{S_\sigma}.$$

The adjoint equations are $$\frac{\partial \vec{\sigma}}{\partial t} = \nabla\left(\frac{1}{\rho}\vec{v}\right) - \sum_{l=1}^{NMECH} \omega_l \left[a_l\left(\vec{\sigma} + \sum_{k=1}^{NMECH} \vec{\xi_k}\right) - \vec{\xi_l}\right] + \frac{\partial F}{\partial \vec{\sigma}},$$

$$\frac{\partial \vec{v}}{\partial t} = div(C\vec{\sigma}),$$

$$\frac{\partial \vec{\xi_l}}{\partial t} = \omega_l \left[a_l\left(\vec{\sigma} + \sum_{k=1}^{NMECH} \vec{\xi_k}\right) - \vec{\xi_l}\right].$$

For the purposes of applications relating to the oil and gas industry, the attenuation factor vs frequency for earth media varies slowly over the frequency range of interest. Hence, the attenuation quality factor $Q(\omega)$ can be considered such that $Q(\omega)=Q_0$ (a constant). To this end, discrete frequencies $\phi_k$ can be selected to determine the amplification factors $a_l$ via a least-squares fit by solving the following non-square linear system of equations:

$$[A_{kl}]\{a_l\} = \{1\}$$

where $$A_{kl} = \frac{Q_0 \phi_k \omega_l + \omega_l^2}{\omega_l^2 + \phi_k^2}.$$

FWI is a partial-differential-equation-constrained optimization method which iteratively minimizes a norm of the misfit between measured and computed wavefields. Seismic FWI involves multiple iterations, and a single iteration can involve the following computations: (1) solution of the forward equations, (2) solution of the adjoint equations, and (3) convolutions of these forward and adjoint solutions to yield a gradient of the cost function. Note that for second-order optimization methods, such as Gauss-Newton, the (4) solution of the perturbed forward equations is also required. A more robust mathematical justification for this case can be found, for example, in U.S. Patent Publication 2013/238,246, the entire content of which is hereby incorporated by reference.

A common iterative inversion method used in geophysics is cost function optimization. Cost function optimization involves iterative minimization or maximization of the value of a cost function $\mathcal{F}(\theta)$ with respect to the model $\theta$. The cost function, also referred to as the objective function, is a measure of the misfit between the simulated and observed data. The simulations (simulated data) are conducted by first discretizing the physics governing propagation of the source signal in a medium with an appropriate numerical method, such as the finite difference or finite element method, and computing the numerical solutions on a computer using the current geophysical properties model.

The following summarizes a local cost function optimization procedure for FWI: (1) select a starting model; (2) compute a search direction $S(\theta)$; and (3) search for an updated model that is a perturbation of the model in the search direction.

The cost function optimization procedure is iterated by using the new updated model as the starting model for finding another search direction, which will then be used to perturb the model in order to better explain the observed data. The process continues until an updated model is found that satisfactorily explains the observed data. Commonly used local cost function optimization methods include gradient search, conjugate gradients, quasi Newton, Gauss-Newton and Newton's method.

Local cost function optimization of seismic data in the acoustic approximation is a common geophysical inversion task, and is generally illustrative of other types of geophysical inversion. When inverting seismic data in the acoustic approximation, the cost function can be written as:

$$\mathcal{F}(\theta) = 1/2 \Sigma_{g=1}^{N_g} \Sigma_{r=1}^{N_r} \Sigma_{t=1}^{N_t} W(\psi_{calc}(\theta,r,t,w_g) - \psi_{obs}(r,t,w_g)), \quad (6)$$

where
$\mathcal{F}(\theta)$=cost function,
$\theta$=vector of N parameters, $(\theta_1, \theta_2, \ldots \theta_N)$ describing the subsurface model,
g=gather index,
$w_g$=source function for gather g which is a function of spatial coordinates and time, for a point source this is a delta function of the spatial coordinates,
$N_g$=number of gathers,
r=receiver index within gather,
$N_r$=number of receivers in a gather,
t=time sample index within a trace,
$N_t$=number of time samples,
W=norm function (minimization function, e.g. for least squares function $(x)=x^2$),
$\psi_{calc}$=calculated seismic data from the model $\theta$,
$\psi_{obs}$=measured seismic data (pressure, stress, velocities and/or acceleration).

The gathers, data from a number of sensors that share a common geometry, can be any type of gather (common midpoint, common source, common offset, common receiver, etc.) that can be simulated in one run of a seismic forward modeling program. Usually the gathers correspond to a seismic shot, although the shots can be more general than point sources. For point sources, the gather index g corresponds to the location of individual point sources. This generalized source data, $\psi_{obs}$, can either be acquired in the field or can be synthesized from data acquired using point sources. The calculated data $\psi_{calc}$ on the other hand can usually be computed directly by using a generalized source function when forward modeling.

FWI attempts to update the discretized model $\theta$ such that $\mathcal{F}(\theta)$ is a minimum. This can be accomplished by local cost function optimization which updates the given model $\theta^{(k)}$ as follows:

$$\theta^{(i+1)} = \theta^{(i)} + \gamma^{(i)} S(\theta^{(i)}) \quad (7)$$

where i is the iteration number, $\gamma$ is the scalar step size of the model update, and $S(\theta)$ is the search direction. For steepest descent, $S(\theta) = -\nabla_\theta \mathcal{F}(\theta)$, which is the negative of the gradient of the misfit function taken with respect to the model parameters. In this case, the model perturbations, or the values by which the model is updated, are calculated by multiplication of the gradient of the objective function with a step length $\gamma$, which must be repeatedly calculated. For second-order optimization techniques, the gradient is scaled by the Hessian (second-order derivatives of objective function with respect to the model parameters). The computation of $\nabla_\theta \mathcal{F}(\theta)$ requires computation of the derivative of $\mathcal{F}(\theta)$ with respect to each of the N model parameters. N is usually very large in geophysical problems (more than one million), and this computation can be extremely time consuming if it has to be performed for each individual model parameter. Fortunately, the adjoint method can be used to efficiently perform this computation for all model parameters at once (Tarantola, 1984). While computation of the gradients using the adjoint method is efficient relative to other methods, it is still very costly for viscoacoustic and viscoelastic FWI.

SUMMARY

A method, including: obtaining, with a computer, an initial geophysical model; modeling, with a computer, a forward wavefield based on the initial geophysical model with wave equations including a second order z-derivative in a rotated coordinate system that accounts for a tilted transverse isotropic (TTI) medium; modeling, with a computer, an adjoint wavefield with adjoint wave equations including a second order z-derivative in a rotated coordinate system that accounts for a tilted transverse isotropic (TTI) medium, wherein the wave equations and the adjoint wave equations include relaxation terms accounting for anelasticity of earth in an update of a primary variable and an evolution relationship for the relaxation terms; obtaining, with a computer, a gradient of a cost function based on a combination of a model of the forward wavefield and a model of the adjoint wavefield; and updating the initial geophysical model, with the computer, with an adjustment determined from the gradient of the cost function to obtain an updated geophysical model.

The method can further include generating a subsurface image of the updated geophysical model that includes subsurface structures.

In the method, the primary variable can be based on stress.

In the method, the evolution relationship can be $$\frac{\partial R_l}{\partial t} = a_l \dot{\sigma} - \omega_l R_l,$$

$R_l$ is a relaxation term, $\dot{\sigma}$ is a first derivative of stress, $a_l$ is a stiffness ratio, and $\omega_l$ is a characteristic relaxation frequency.

In the method, the wave equations can be $$\frac{\partial \vec{\sigma}}{\partial t} = \dot{\vec{\sigma}} + \vec{S_\sigma} - \sum_{l=1}^{NMECH} \omega_l \vec{m_l},$$

$$\frac{\partial \dot{\vec{\sigma}}}{\partial t} = C\vec{\sigma}, \text{ and}$$

$$\frac{\partial \vec{m_l}}{\partial t} = -\omega_l \vec{m_l} + a_l \dot{\vec{\sigma}}, \text{ and}$$

the adjoint wave equations are $$-\frac{\partial \overleftarrow{\sigma}}{\partial t} = \dot{\overleftarrow{\sigma}} + \sum_{l=1}^{NMECH} a_l \overleftarrow{m_l},$$

$$-\frac{\partial \dot{\overleftarrow{\sigma}}}{\partial t} = C\overleftarrow{\sigma} + \overleftarrow{S_\sigma}, \text{ and}$$

$$\frac{\partial \overleftarrow{m_l}}{\partial t} = -\omega_l \overleftarrow{m_l} + a_l \dot{\overleftarrow{\sigma}},$$

with t being time, $\dot{\sigma}$ being a first derivative of stress, $a_l$ being a stiffness ratio, and $\omega_l$ being a characteristic relaxation frequency, $\sigma$ a being stress, $m_l$ being a memory response, C being material properties, and $S_\sigma$ being application of a source to stress.

The method can further include causing a well to be drilled at a location derived from the subsurface image.

The method can further include, based at least in part on the updated geophysical model, estimating a subsurface property that indicates hydrocarbon deposits in a subterranean geologic formation.

In the method, the subsurface property can be at least one of velocity, density, or impedance.

A method, including: obtaining, with a computer, an initial geophysical model; modeling, with a computer, a forward wavefield based on the initial geophysical model with wave equations including a second order z-derivative in a rotated coordinate system that accounts for a tilted transverse isotropic (TTI) medium; modeling, with a computer, an adjoint wavefield with adjoint wave equations including a second order z-derivative in a rotated coordinate system that accounts for a tilted transverse isotropic (TTI) medium, wherein the wave equations and the adjoint wave equations include relaxation terms accounting for anelasticity of earth in an update of a primary variable and an evolution relationship for the relaxation terms; obtaining, with a computer, an imaging condition based on a combination of a model of the forward wavefield and a model of the adjoint wavefield; and generating a subsurface image from the imaging condition.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

A first order implementation is efficient for the models without rotations, such as vertical transversely isotropic (VTI) models. There are several ways to address propagation in the TTI media. For the implementation of the stress-velocity in a TTI media, a rotated staggered or Lebedev grid can be used. It is significantly more expensive than a staggered grid implementation used for the VTI media. It has also been suggested to implement Q related algorithms in frequency domain by pseudo-spectral method, see for example (J. Ramos-Martinez* et al. 2015, Valenciano et al. 2011) or using Low Rank modification of the pseudo-spectral method (Sun et al.).

Modeling of waves in a TTI media is computationally cheaper using a collocated grid (second-order formulation) as compared to a staggered grid (first-order formulation). A time domain second order isotropic system has been discussed in literature before (see, Askan et al. 2007).

An alternative way to look at the second order TTI system has been suggested in (Yi Xie et al. 2015). However, this is different from the present technological advancement. The starting point of the derivation in Yi Xie et al. is the fractional derivative model, wherein the present technological advancement can start with a formulation that uses SLS physical mechanisms. As a result, the final form of the equations in Yi Xie et al. have a dependence on the exponent fractional derivative, while the formulation of the present technological advancement does not.

The general form of a second-order stress formulation for a VTI/TTI system without attenuation can be summarized as $$\frac{\partial^2}{\partial t^2}\begin{pmatrix}\sigma_H \\ \sigma_V\end{pmatrix} = A\left(\frac{\partial^2}{\partial x^2}+\frac{\partial^2}{\partial y^2}+\frac{\partial^2}{\partial z^2}\right)\begin{pmatrix}\sigma_H \\ \sigma_V\end{pmatrix} + B\frac{\partial^2}{\partial z^2}\begin{pmatrix}\sigma_H \\ \sigma_V\end{pmatrix} + \frac{\partial \vec{S_\sigma}}{\partial t}, \quad (1)$$

where constant density is assumed and a symmetry condition is used, and $\sigma_{11} \equiv \sigma_{22}$. In the TTI media, the z-axis is aligned along an axis of symmetry n, then the governing equation becomes $$\frac{\partial^2}{\partial t^2}\begin{pmatrix}\sigma_H \\ \sigma_V\end{pmatrix} = A\left(\frac{\partial^2}{\partial x^2}+\frac{\partial^2}{\partial y^2}+\frac{\partial^2}{\partial z^2}\right)\begin{pmatrix}\sigma_H \\ \sigma_V\end{pmatrix} + B\frac{\partial^2}{\partial \tilde{z}^2}\begin{pmatrix}\sigma_H \\ \sigma_V\end{pmatrix} + \frac{\partial \vec{S_\sigma}}{\partial t}, \quad (2)$$

where the current configuration $(\tilde{x},\tilde{y},\tilde{z})$ is related to the reference configuration $(x,y,z)$ via $$\frac{\partial^2}{\partial \tilde{z}^2}(\cdot) = \left[n_x^2\frac{\partial^2}{\partial x^2}+n_y^2\frac{\partial^2}{\partial x^2}+n_z^2\frac{\partial^2}{\partial z^2}+2n_xn_y\frac{\partial^2}{\partial xy}+2n_yn_z\frac{\partial^2}{\partial yz}+2n_xn_z\frac{\partial^2}{\partial xz}\right] \quad (3)$$

Here, A and B are matrices of material properties.

Since the VTI and TTI systems are related in a straightforward way via a rotation tensor, the following will focus on the VTI system for simplicity. Accordingly, the above governing equations in second order form can be recast into first order form as follows:

$$\frac{\partial \vec{\sigma}}{\partial t} = \dot{\vec{\sigma}} + \vec{S_\sigma}, \quad (4)$$

$$\frac{\partial \dot{\vec{\sigma}}}{\partial t} = C\vec{\sigma}, \quad (5)$$

where A and B from (2) are merged into C to shorten the notation, and the corresponding adjoint equations are as follows:

$$-\frac{\partial \overleftarrow{\sigma}}{\partial t} = \dot{\overleftarrow{\sigma}}, \quad (6)$$

$$-\frac{\partial \dot{\overleftarrow{\sigma}}}{\partial t} = C\overleftarrow{\sigma} + \overleftarrow{S_\sigma} \quad (7)$$

$S_\sigma$ is the source term. When the data is recorded by a receiver, the actual signal that the ship (in the context of a marine application) can be applied to either the stress term or the velocity term. Here $S_\sigma$ means that the seismic source is applied to stress.

With the introduction of attenuation, we can derive the governing forward wave equations as follows:

$$\frac{\partial \vec{\sigma}}{\partial t} = \dot{\vec{\sigma}} + \vec{S_\sigma} - \sum_{l=1}^{NMECH}\omega_l\vec{m_l}, \quad (8)$$

$$\frac{\partial \dot{\vec{\sigma}}}{\partial t} = C\vec{\sigma} \quad (9)$$

$$\frac{\partial \vec{m_l}}{\partial t} = -\omega_l\vec{m_l} + a_l\dot{\vec{\sigma}}, \quad (10)$$

and the corresponding adjoint equations are $$-\frac{\partial \overleftarrow{\sigma}}{\partial t} = \dot{\overleftarrow{\sigma}} + \sum_{l=1}^{NMECH}a_l\overleftarrow{m_l} \quad (11)$$

$$-\frac{\partial \dot{\overleftarrow{\sigma}}}{\partial t} = C\overleftarrow{\sigma} + \overleftarrow{S_\sigma} \quad (12)$$

$$\frac{\partial \overleftarrow{m_l}}{\partial t} = -\omega_l\overleftarrow{m_l} + \alpha_l\dot{\overleftarrow{\sigma}}. \quad (13)$$

With respect to the equations (8)-(13), Q is accounted for in the form of $\vec{m_l}$ (which are the memory variables). Modeling of viscoelastic behavior can be done in many ways. One such realization is a phenomenological model based on a series and parallel configuration of springs and dashpots, also referred to as the Standard Linear Solid (SLS) approach.

As an example of the second order we summarize strain-related formulation by substituting $$A = \begin{pmatrix} c_{11} & 0 \\ \tilde{c}_{13} & c_{44} \end{pmatrix} \quad (14)$$

and $$B = \begin{pmatrix} c_{11} - c_{44} & \tilde{c}_{13} \\ -\tilde{c}_{13} & c_{33} - c_{44} \end{pmatrix}, \quad (15)$$

where $$c_{13} = \sqrt{(v_{pz}^2 - v_{sz}^2) * (v_{pn}^2 - v_{sz}^2)} - v_{sz}^2,$$

$$c_{44} = v_{sz}^2, \quad c_{33} = v_{pz}^2, \quad c_{11} = v_{px}^2,$$

with $$v_{px} = v_{pz}\sqrt{1+2\varepsilon}, \quad v_{pn} = v_{pz}\sqrt{1+2\delta}, \quad \tilde{c}_{13} = c_{13} + v_{sz}^2,$$

into (2) for A and B correspondently.

EXAMPLE

Figure 1:
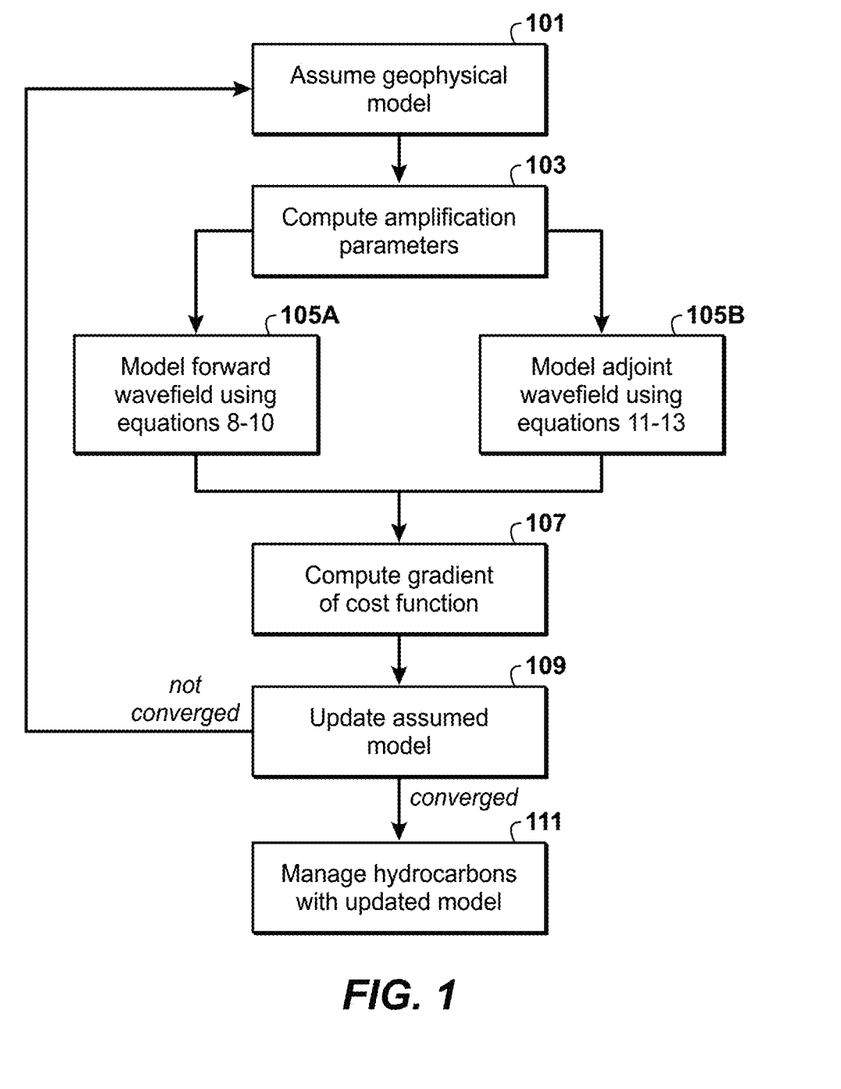
FIG. 1 illustrates an exemplary method embodying the present technological advancement.

FIG. 1 illustrates an exemplary method for a visco-pseudo-elastic TTI FWI using Equations (8) to (13). In step 101, a geophysical model is assumed. A geophysical model gives one or more subsurface properties as a function of location in a region.

In step 103, amplification factors $a_l$ are computed.

In steps 105A and 105B, the forward wavefield model Equations (8)-(10) and the adjoint model Equations (11)-(13) are solved.

In step 107, the gradient of the cost function is obtained from a convolution of the forward and adjoint equations in order to arrive at the gradients of the objective function with respect to the inversion parameter(s).

In step 109, the gradient of the cost function (which provides the rate of the change of the cost function in a given direction) is then used to update the geophysical model in order to minimize the cost function. Step 109 can include searching for an updated geophysical property model that is a perturbation of the initial geophysical property model in the gradient direction that better explains the observed data. The iterative process of FIG. 1 can be repeated until predetermined convergence between measured data and the updated model is obtained.

When the updated assumed model converges, the process proceeds to step 111. In step 111, an updated subsurface model is used to manage hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. Based at least in part on the updated geophysical model, step 111 can include estimating a subsurface property that indicates hydrocarbon deposits in a subterranean geologic formation.

Figure 2:
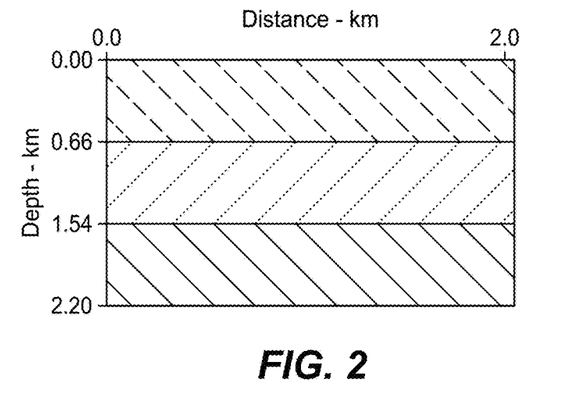
FIG. 2 illustrates an exemplary three-layer VTI true model.

The subsurface property can include velocity, density, or impedance. The following describes a modeling experiment to illustrate a comparison of simulated reflected data via a conventional first order formulation and simulated reflected data via the present technological advancement. FIG. 2 illustrates a 3 layer true VTI model (a VTI model is used for this example because there is no suitable and available conventional techniques to compare to the present technological advancement; for the present technological advancement, the title is set to zero in order to be applicable to a VTI model). The model extents in (x,y,z) directions are 2047.5 m×2060 m×2200 m, with grid spacing of $\Delta x=19.5$ m, $\Delta y=\Delta z=20$ m. There are two horizontal reflectors located at depths of 660 m and 1540 m. The properties in each layer of the three layers are listed in the order $(V_{p0},\rho,\varepsilon,\delta)$ and listed in the order of increasing depth are (1500.0, 1.0, 0.0, 0.0), (1700.0, 1.0, 0.2, 0.10) and (1500.0, 1.0, 0.2, 0.10). $V_{s0}$ is generated using $$V_{s0} = \sqrt{4/3\|\varepsilon - \delta\|} V_{p0}.$$

A uniform background Q=100 is assumed.

Figure 3:
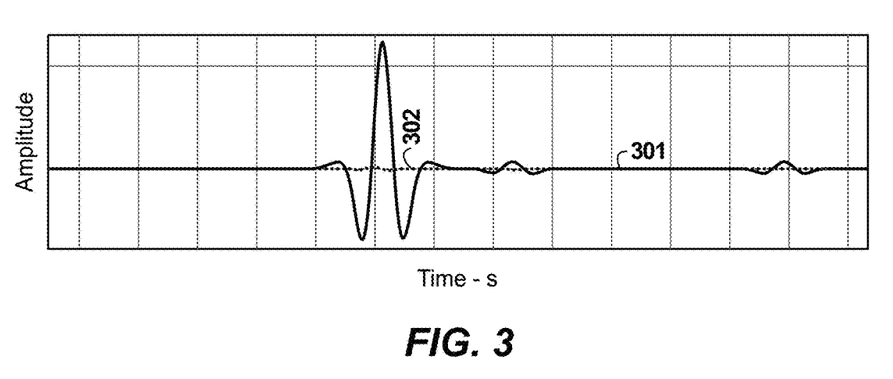
FIG. 3 illustrates a comparison of a far-offset modeled trace.

FIG. 3 illustrates a comparison of far-offset modeled traces of the reflected pressure data generated via forward simulation using the true model of FIG. 2 by the conventional first order technique and the present technological advancement. 301 is a trace generated by the present technological advancement and 302 is the difference between the present technological advancement and the conventional first order technique. As expected, the difference is minuscule.

The present technological advancement is also applicable to RTM. The RTM image can be based on the same principles as the first gradient from FWI, with a difference between the two being the imaging condition and is not directly related to Q.

For RTM, a Q model is built, forward modeling and back propagation with the Q model is performed using the relaxation mechanisms as described above for the present technological advancement, and then the RTM imaging condition is performed to form the image.

In another example, a modeling experiment illustrates the comparison of the reflected data simulated via first order formulation with the proposed second order formulation. This example utilized the three layer VTI model of FIG. 2. This VTI model is described above and its characteristics are not repeated here.

Seismic attenuation attenuates the amplitude as well as distorts the phase of the propagating wave as clearly seen from the above example. The proposed second-order formulation accounts for these phase and amplitude corrections in a form consistent with the usual standard first-order formulation.

Figure 4A:
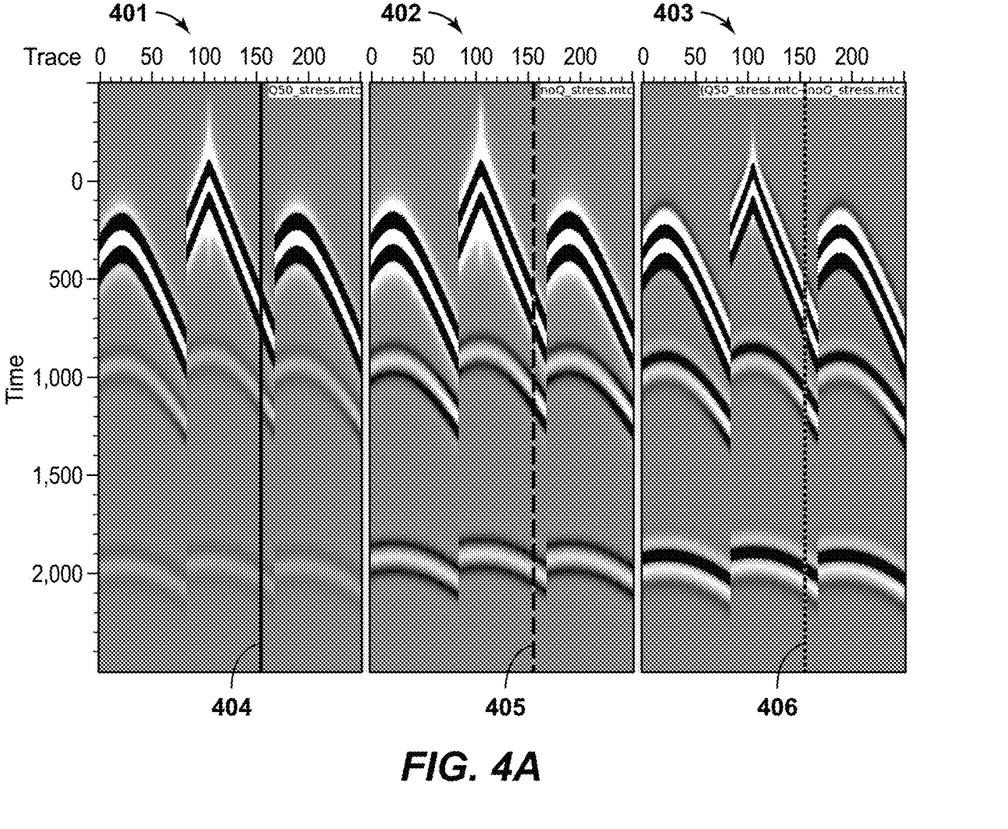
FIG. 4A illustrates a comparison of stress plots generated via forward simulation with and without attenuation.

FIG. 4A illustrates a comparison of stress plots generated via forward simulation with and without attenuation. 401 is the response where the medium is anelastic, 402 is the response without anelasticity, and 403 is the difference between 401 and 402.

Figure 4B:
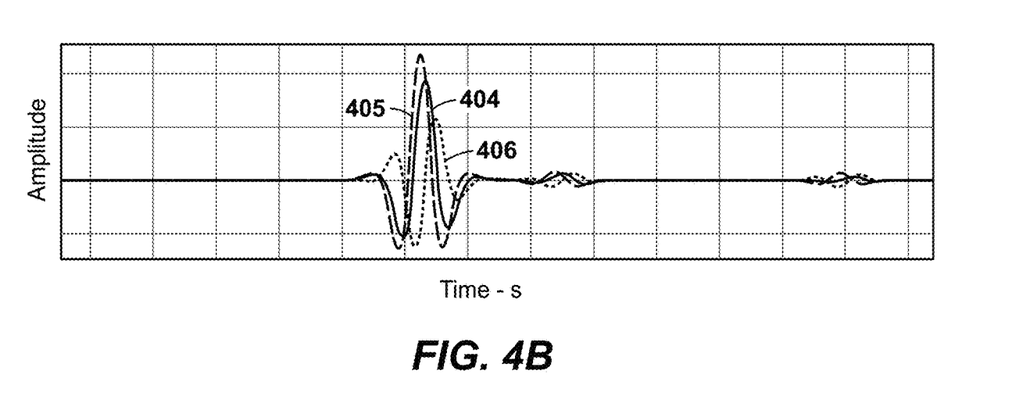
FIG. 4B is a comparison of traces of the reflected pressure data generated via forward simulation with and without attenuation.

FIG. 4B is a comparison of traces of the reflected pressure data generated via forward simulation with and without attenuation. The plot compares a far offset trace simulated by the proposed second-order formulation. 404 is the response where the medium is anelastic, 405 is the response without anelasticity and the difference is 406.

Derivation

The following discussion explains a derivation of the second order visco-acoustic stress-only equations with a desired dispersion relation.

In the absence of viscous effect, the wave propagation can be formulated in the following second order stress-only equation:

$$\frac{\partial^2 \sigma}{\partial t^2} = C\sigma$$

For a plane-wave mode $\sigma = \exp[i(\omega t - q \cdot x)]\vec{\xi}$, where q is the space wave number, $\omega$ is temporal frequency, and $\vec{\xi}$ is the polarization vector, the following dispersion relation holds $$\frac{\omega^2}{q^2} = C(q)$$

With N visco-elastic mechanisms (NMECH) to mimic the physical visco-elastic effect, the desired dispersion relation is $$\omega^2 = C(q)\left(1 - \sum_{l=1}^{NMECH} \frac{a_l \omega_l}{\omega_l + i\omega}\right)$$

To achieve this goal, the original governing equation is modified to $$\frac{\partial \sigma}{\partial t} = \dot{\sigma} - \sum_{l=1}^{NMECH} \omega_l R_l$$

$$\frac{\partial \dot{\sigma}}{\partial t} = C\sigma$$

$$\frac{\partial R_l}{\partial t} = a_l \dot{\sigma} - \omega_l R_l.$$

The first two equations are the governing equations. The third equation shows the evolution of the memory variables R with time.

The normal equation for the above system is $$i\omega\hat{\sigma} = \hat{\dot{\sigma}} - \sum_{l=1}^{NMECH} \omega_l \hat{R}_l$$

$$i\omega\hat{\dot{\sigma}} = C(q)\hat{\sigma}$$

$$i\omega\hat{R}_l = a_l\hat{\dot{\sigma}} - \omega_l\hat{R}_l.$$

Solving these equations and eliminating $\hat{\dot{\sigma}}$ and $\hat{R}_l$ yields $$i\omega\hat{\sigma} = \frac{C(q)}{i\omega}\hat{\sigma} - \sum_{l=1}^{NMECH} \frac{a_l\omega_l}{\omega_l + i\omega}\frac{C(q)}{i\omega}\hat{\sigma},$$

which leads to the desired dispersion relation.

Computer Implementation

In all practical applications, the present technological advancement must be used in conjunction with a computer, programmed in accordance with the disclosures herein. Preferably, in order to efficiently perform FWI, the computer is a high performance computer (HPC), known as to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

Conclusion

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

The following documents are each incorporated by reference in their entirety:
1. Tarantola, A., (1984) "Inversion of seismic reflection data in the acoustic approximation," *Geophysics,* v. 49, no. 8, pp. 1259-1266.
2. Hak, B., and Mulder W. A. (2011) "Seismic attenuation imaging with causality," *Geophysical Journal International,* v. 184, no. 1, pp. 439-451.
3. Day, S. M. and Minster J. B. (1984) "Numerical simulation of attenuated wavefields using a Padé approximant method," *Geophysical Journal of International,* v. 78, pp. 105-118.
4. Ursin, B. and Toverud, T. (2002) "Comparison of seismic dispersion and attenuation models," *Studia Geophysica et Geodaetica,* v. 46, pp. 293-320.
5. Carcione, J. M., Kosloff D. and Kosloff R. (1988) "Viscoacoustic wave propagation simulation in the Earth," *Geophysics,* v. 53, no. 6, pp. 769-777.
6. Carcione J. M. (2007) "Wave fields in real media: Wave propagation in anisotropic anelastic, porous and electromagnetic media" *Handbook of Geophysical Exploration: Seismic Exploration,* v. 38, Elsevier, $2^{nd}$ Edition.
7. Muller, T. M., Gurevich, B. and Lebedev, M. (2010) "Seismic wave attenuation and dispersion resulting from wave-induced flow in porous rocks—A review," *Geophysics,* v. 75, no. 5, pp. 147-164.
8. Bai, J., Yingst D., Bloor R. and Leveille J. (2012) "Waveform inversion with attenuation," *Society of Exploration Geophysicists Extended Technical Abstract,* 5 pgs.
9. Royle, G. T. (2011) "Viscoelastic Orthorhombic Full Wavefield Inversion: Development of Multiparameter Inversion Methods," *Society of Geophysicist Extended Abstract,* pp. 4329-4333.
10. Robertsson, J. O. A., Blanch J. O. and Symes W. W. (1994) "Viscoelastic finite-difference modeling," *Geophysics,* v. 59, no. 9, pp. 1444-1456.
11. Hestholm, S., Ketcham, S., Greenfield, R., Moran, M. and McMechan G., (2006) "Quick and accurate Q parameterization in viscoelastic wave modeling," *Geophysics,* v. 71, no. 5, pp. 147-150.
12. Charara, M., Barnes, C. and Tarantola, A. (2000) "Full waveform inversion of seismic data for a viscoelastic medium" *Methods and Applications of Inversion: Lecture Notes in Earth Sciences,* v. 92, pp. 68-81.
13. Käser, M., Dumbser, M., Puente, J. and Igel, H. (2007) "An arbitrary high-order Discontinuous Galerkin method for elastic waves on unstructured meshes—III. Viscoelastic attenuation," *Geophysics Journal International,* v. 168, no. 1, pp. 224-242.

14. JafarGandomi, A. and Takenaka, H., (2007) "Efficient FDTD algorithm for plane-wave simulation for vertically heterogeneous attenuative media," *Geophysics*, v. 72, no. 4, pp. 43-53.
15. Quintal, B., (2012) "Frequency-dependent attenuation as a potential indicator of oil saturation," *Journal of Applied Geophysics*, v. 82, pp. 119-128.
16. Betts, J. T. and Campbell, S. L., (2005) "Discretize then optimize," *Mathematics in Industry: Challenges and Frontiers A Process View: Practice and Theory*, Ferguson, D. R. and Peters, T. J., eds., SIAM Publications.
17. Thevenin D. and Janiga G., (2008) "Optimization and computational fluid dynamics," Springer-Verlag.
18. J. Ramos-Martinez, A. A. Valenciano, Sean Crawley & M. Orlovich (PGS) (2015) "Viscoacoustic compensation in RTM using the pseudo-analytical extrapolator," *SEG Technical Program Expanded Abstracts*, pp. 3954-3958.
19. Valenciano, A. A., Chemingui, N., Whitmore, D and Brandsberg-Dahl, S. (2011) "Wave equation migration with attenuation and anisotropic compensation," 81*st* *Annual International Meeting, SEG, Expanded Abstracts*, pp. 232-236.
20. Aysegul Askan, Volkan Akcelik, Jacobo Bielak, and Omar Ghattas, (2007), "Full Waveform Inversion for Seismic Velocity and Anelastic Losses in Heterogeneous Structures," *Bulletin of the Seismological Society of America*, v. 97, no. 6, pp. 1990-2008, December 2007, doi: 10.1785/0120070079.
21. Junzhe Sun, Sergey Fomel, and Tieyuan Zhu, (2014), "Viscoacoustic modeling and imaging using low-rank approximation," *SEG Technical Program Expanded Abstracts*, v. 80, no. 5, pp. A-103-A108.
22. Yi Xie, James Sun, Yu Zhang, Joe Zhou (2015) "Compensating for visco-acoustic effects in TTI reverse time migration," *SEG New Orleans Annual Meeting*, pp. 3996-3998.
23. Same as #26 US2016/291,178 (below)
24. Denli, H., Akcelik, V., Kanevsky, A., Trenev, D., White, L. and Lacasse, M. (2013) "Full-Wavefield Inversion for Acoustic Wave Velocity and Attenuation," *SEG Annual Meeting, Society of Exploration Geophysicists*, pp. 980-985.
25. U.S. Pat. No. 8,194,498 (2012) Du, X. et al., 22 pgs.
26. U.S. Patent Publication 2016/291,178 (2016) Xie, Y. et al., 16 pgs.
27. U.S. Patent Publication 2015/362,622 (2015) Denli, H. et al., 20 pgs.

What is claimed is:

1. A method, comprising:
obtaining, with a computer, an initial geophysical model;
determining a stiffness ratio ($a_l$);
modeling, with a computer, a forward wavefield based on the initial geophysical model with wave equations including a second order z-derivative in a rotated coordinate system that accounts for a tilted transverse isotropic (TTI) medium:
modeling, with a computer, an adjoint wavefield with adjoint wave equations including a second order z-derivative in a rotated coordinate system that accounts for a tilted transverse isotropic (TTI) medium,
wherein the wave equations and the adjoint wave equations include relaxation terms accounting for anelasticity of earth in an update of a primary variable and an evolution relationship for the relaxation terms, and further wherein the evolution relationship is $$\frac{\partial R_l}{\partial t} = a_l \dot{\sigma} - \omega_l R_l,$$

in which $R_l$ is a relaxation term, $\dot{\sigma}$ is a first derivative of stress, $a_l$ is the stiffness ratio, and $\omega_l$ is a characteristic relaxation frequency, and wherein:
the wave equations are $$\frac{\partial \vec{\sigma}}{\partial t} = \dot{\vec{\sigma}} + \vec{S_\sigma} - \sum_{l=1}^{NMECH} \omega_l \vec{m_l},$$

$$\frac{\partial \dot{\vec{\sigma}}}{\partial t} = C\vec{\sigma}, \text{ and}$$

$$\frac{\partial \vec{m_l}}{\partial t} = -\omega_l \vec{m_l} + a_l \dot{\vec{\sigma}}, \text{ and}$$

the adjoint wave equations are $$-\frac{\partial \overleftarrow{\sigma}}{\partial t} = \dot{\overleftarrow{\sigma}} + \sum_{l=1}^{NMECH} a_l \overleftarrow{m_l},$$

$$-\frac{\partial \dot{\overleftarrow{\sigma}}}{\partial t} = C\overleftarrow{\sigma} + \overleftarrow{S_\sigma}, \text{ and}$$

$$\frac{\partial \overleftarrow{m_l}}{\partial t} = -\omega_l \overleftarrow{m_l} + a_l \dot{\overleftarrow{\sigma}},$$

with t being time, $\dot{\sigma}$ being a first derivative of stress, $a_l$ being the stiffness ratio, and $\omega_l$ being a characteristic relaxation frequency, $\sigma$ being stress, $m_l$ being a memory response, C being material properties, and $S_\sigma$ being application of a source to stress;
obtaining, with a computer, a gradient of a cost function based on a combination of a model of the forward wavefield and a model of the adjoint wavefield; and
updating the initial geophysical model, with the computer, with an adjustment determined from the gradient of the cost function to obtain an updated geophysical model.

2. The method of claim 1, further comprising generating a subsurface image of the updated geophysical model that includes subsurface structures.

3. The method of claim 2, further comprising causing a well to be drilled at a location derived from the subsurface image.

4. The method of claim 1, wherein the primary variable is based on stress.

5. The method of claim 1, further comprising, based at least in part on the updated geophysical model, estimating a subsurface property that indicates hydrocarbon deposits in a subterranean geologic formation.

6. The method of claim 1, wherein the subsurface property is at least one of velocity, density, or impedance.

7. A method, comprising:
obtaining, with a computer, an initial geophysical model:
determining a stiffness ratio ($a_l$);
modeling, with a computer, a forward wavefield based on the initial geophysical model with wave equations including a second order z-derivative in a rotated coordinate system that accounts for a tilted transverse isotropic (TTI) medium;
modeling. with a computer, an adjoint wavefield with adjoint wave equations including a second order z-derivative in a rotated coordinate system that accounts for a tilted transverse isotropic (TTI) medium;

wherein the wave equations and the adjoint wave equations include relaxation terms accounting for anelasticity of earth in an update of a primary variable and an evolution relationship for the relaxation terms, and further wherein the evolution relationship is $$\frac{\partial R_l}{\partial t} = a_l \dot{\sigma} - \omega_l R_l,$$

in which $R_l$ is a relaxation term, $\dot{\sigma}$ is a first derivative of stress, $a_l$ is the stiffness ratio, and $\omega_l$ is a characteristic relaxation frequency, and wherein:

the wave equations are $$\frac{\partial \vec{\sigma}}{\partial t} = \dot{\vec{\sigma}} + \vec{S_\sigma} - \sum_{l=1}^{NMECH} \omega_l \vec{m_l},$$

$$\frac{\partial \vec{\sigma}}{\partial t} = C\vec{\sigma}, \text{ and}$$

$$\frac{\partial \vec{m_l}}{\partial t} = -\omega_l \vec{m_l} + a_l \dot{\vec{\sigma}}, \text{ and}$$

the adjoint wave equations are $$-\frac{\partial \overleftarrow{\sigma}}{\partial t} = \dot{\overleftarrow{\sigma}} + \sum_{l=1}^{NMECH} a_l \overleftarrow{m_l},$$

$$-\frac{\partial \overleftarrow{\sigma}}{\partial t} = C\overleftarrow{\sigma} + \overleftarrow{S_\sigma}, \text{ and}$$

$$\frac{\partial \overleftarrow{m_l}}{\partial t} = -\omega_l \overleftarrow{m_l} + a_l \dot{\overleftarrow{\sigma}},$$

with t being time, $\dot{\sigma}$ being a first derivative of stress, $a_l$ being the stiffness ratio, and $\omega_l$ being a characteristic relaxation frequency, a being stress, $m_l$ being a memory response, C being material properties, and $S_\sigma$ being application of a source to stress;

obtaining, with a computer, an imaging condition based on a combination of a model of the forward wavefield and a model of the adjoint wavefield; and generating a subsurface image from the imaging condition.

8. The method of claim 7, wherein the subsurface property is at least one of velocity, density, or impedance.

9. The method of claim 7, wherein the primary variable is based on stress.

10. The method of claim 9, further comprising causing a well to be drilled at a location derived from the subsurface image.

11. The method of claim 7, further comprising, based at least in part on the subsurface image, estimating a subsurface property that indicates hydrocarbon deposits in a subterranean geologic formation.

* * * * *